(12) United States Patent
Gao et al.

(10) Patent No.: US 9,042,932 B2
(45) Date of Patent: May 26, 2015

(54) METHOD FOR CONFIGURING TRANSMIT POWER OF SOUNDING REFERENCE SIGNAL, NETWORK DEVICE AND UE

(75) Inventors: Qiubin Gao, Beijing (CN); Zukang Shen, Beijing (CN); Deshan Miao, Beijing (CN); Xueming Pan, Beijing (CN); Shaohui Sun, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 224 days.

(21) Appl. No.: 13/319,031

(22) PCT Filed: May 5, 2010

(86) PCT No.: PCT/CN2010/072468
§ 371 (c)(1),
(2), (4) Date: Nov. 4, 2011

(87) PCT Pub. No.: WO2010/127623
PCT Pub. Date: Nov. 11, 2010

(65) Prior Publication Data
US 2012/0052904 A1    Mar. 1, 2012

(30) Foreign Application Priority Data
May 5, 2009   (CN) .......................... 2009 1 0083197

(51) Int. Cl.
*H04B 7/00*  (2006.01)
*H04W 52/24* (2009.01)
*H04W 52/40* (2009.01)
(Continued)

(52) U.S. Cl.
CPC ............ *H04W 52/242* (2013.01); *H04W 52/08* (2013.01); *H04W 52/146* (2013.01); *H04W 52/325* (2013.01); *H04W 52/40* (2013.01)

(58) Field of Classification Search
None
See application file for complete search history.

(56) References Cited

U.S. PATENT DOCUMENTS 6,101,179 A * 8/2000 Soliman ........................ 370/342
6,405,046 B1 * 6/2002 Kumaran et al. ............. 455/453
(Continued)

FOREIGN PATENT DOCUMENTS

CN         2646963 Y    10/2004
WO    2010124241 A2    10/2010

OTHER PUBLICATIONS

Chinese Office Action for Application No. 2009100831979, dated Dec. 10, 2013 and its English translation thereof.
(Continued)

*Primary Examiner* — Fayyaz Alam
*Assistant Examiner* — Mohammed Rachedine
(74) *Attorney, Agent, or Firm* — Harness, Dickey & Pierce, P.L.C.

(57) ABSTRACT

The present invention provides two methods for configuring transmit power of sounding reference signal (SRS), a network device and a UE. One of the methods includes: with a network device, determining SRS transmit power parameters according to power level of signal previously sent from a UE received by each cell to be detected and/or information of cells to be detected by the UE, and sending the SRS transmit power parameters to the UE. The present invention can have an overall consideration on path losses of multiple cells to be detected when calculating the SRS transmit power. Therefore, the power of the cell having poor channel quality for receiving SRS can be guaranteed, in order to ensure the accuracy of channel estimation.

19 Claims, 1 Drawing Sheet

(51) Int. Cl.
*H04W 52/08* (2009.01)
*H04W 52/14* (2009.01)
*H04W 52/32* (2009.01)

(56) References Cited

U.S. PATENT DOCUMENTS

| | | | |
|---|---|---|---|
| 8,897,828 B2* | 11/2014 | Anderson | 455/522 |
| 2003/0068984 A1* | 4/2003 | Shin et al. | 455/69 |
| 2007/0129094 A1* | 6/2007 | Jeong et al. | 455/522 |
| 2008/0045260 A1* | 2/2008 | Muharemovic et al. | 455/522 |

OTHER PUBLICATIONS

European Search Report for Application No. 10772026.0-1246/2429244, dated Oct. 1, 2012.
"Evolved Universal Terrestrial Radio Access (E-UTRA)." ETSI 8.5 (2009): 1-76. Print.
Korean Notice of Decision for Rejection for Application No. 10-2011-7028848, dated Oct. 29, 2013, and its English translation thereof.
Korean Notice to Submit Response for Application No. 10-2011-7028848, dated Apr. 19, 2013 and its English translation thereof.
International Search Report for PCT/CN2010/072468 (in English and Chinese), mailed Aug. 12, 2010; ISA/CN.

* cited by examiner

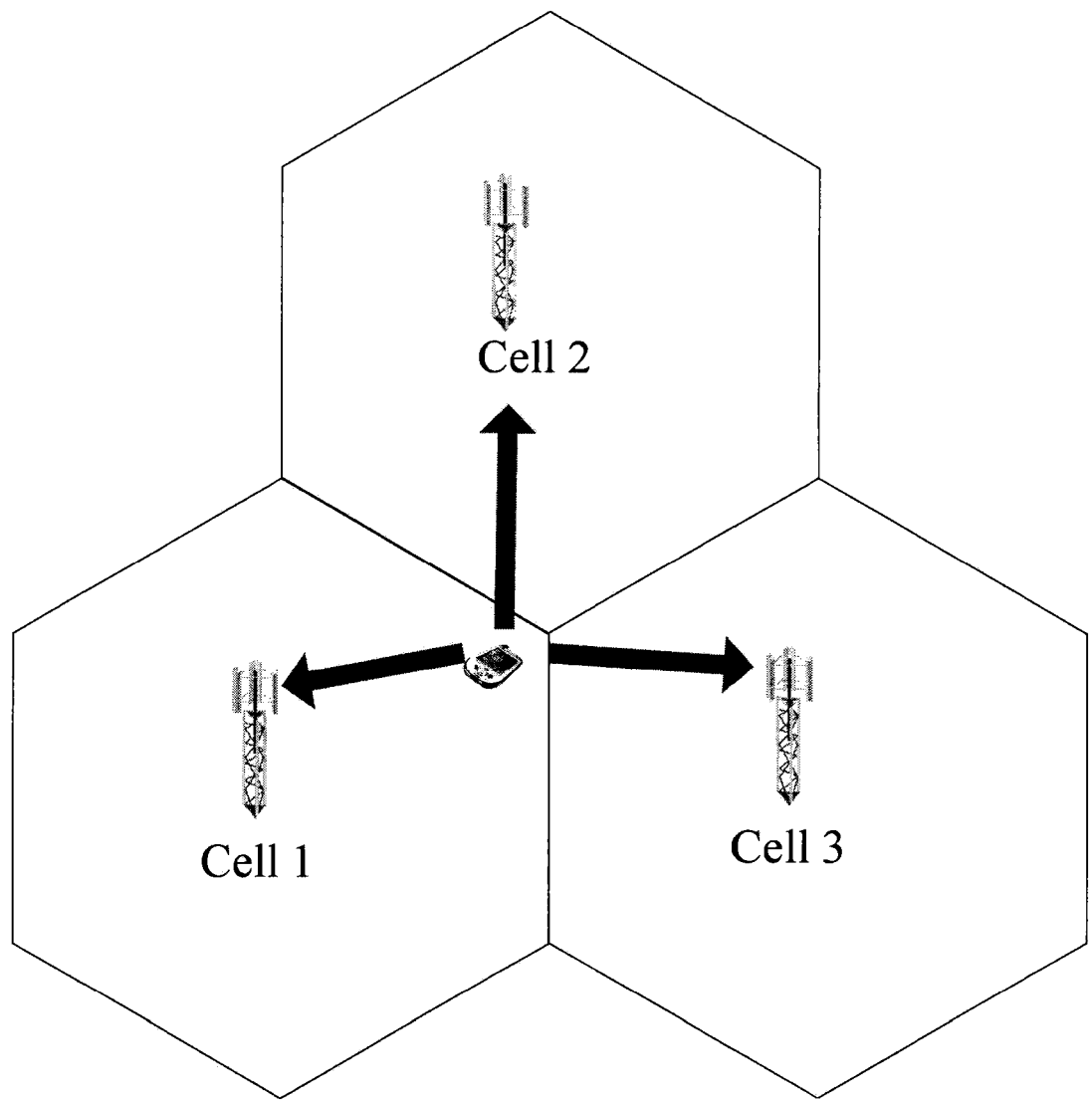

METHOD FOR CONFIGURING TRANSMIT POWER OF SOUNDING REFERENCE SIGNAL, NETWORK DEVICE AND UE

CROSS REFERENCE TO RELATED APPLICATIONS

This application is a U.S. National Stage Application of International Application No. PCT/CN2010/072468, filed May 5, 2010 and published in Chinese as WO/2010/127623 on Nov. 11, 2010. This application also claims the benefit of Chinese Application No. 200910083197.9 filed May 5, 2009. The disclosure(s) of the above application are incorporated herein by reference.

FIELD OF THE INVENTION

The present invention relates to 3GPP Long Term Evolution (LTE) system, and more particularly relates to a method for configuring transmit power of sounding reference signal (SRS), network device and UE.

BACKGROUND OF THE INVENTION

In the LTE system, a UE sends Sounding Reference Signal (SRS) on time and frequency resources specified by a cell where it resides, for detecting the resident cell. An evolved Node B (eNodeB) in the cell estimates channel information from the UE to the eNodeB according to the SRS sent from the UE and the signal received by the eNodeB, as the basis for uplink frequency scheduling, MCS selection and resource allocation.

The power of the UE for transmitting the SRS is calculated based on an instruction of the eNodeB and path loss from the UE to its resident cell, specifically by use of equation (1), where $P_{SRS}(i)$ is the transmit power of SRS, i is a sub-frame number of the SRS, $P_{CMAX}$ is maximum transmit power of the UE, $P_{SRS\_OFFSET}$ is a power parameter of the UE, $M_{SRS}$ is the bandwidth of the SRS transmission, $P_{O\_PUSCH}(j)$ and f(i) are the same as corresponding power parameters of the PUSCH channel, PL is the path loss from the UE to its resident cell, $\alpha(j) \cdot PL$ is the compensation amount of path loss.

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\} \quad (1)$$

The eNodeB instructs the UE of SRS transmit power parameters (including $P_{SRS\_OFFSET}$, $M_{SRS}$, $P_{O\_PUSCH}(j)$, $\alpha(j)$ and f(i)) via a parameter configuration command; the UE calculates PL, and calculates the SRS transmit power according to equation (1) by use of PL, $P_{CMAX}$ and the received SRS transmit power parameters.

In the 3GPP LTE Advanced system, multi-point coordinated transmission technology is adopted to improve quality of service of cell edge users. The multi-point coordinated transmission technology uses joint scheduling or coordinated transmission of multiple cells geographically separated to improve quality of signals received by users and reduce inter-cell interference, thereby effectively improving spectral efficiency of edge users and system capacity. In the multi-point coordinated transmission technology, information of channels from a UE to more than one cell is an important factor affecting system performance. Then, there is a need for a UE supporting the multi-point coordinated transmission technology to perform channel detection for multiple cells, i.e., send SRS to the multiple cells. When the UE sends an SRS, equation (1) can still be used to determine the SRS transmit power. However, since path loss of the UE to each of the cells is different from each other because of the difference on distances from the multiple cells to the UE, it may appear that the SRS signal sent from the UE and received by an eNodeB far from the UE is weak if the SRS transmit power is still calculated in accordance with the path loss from the UE to its resident cell, leading to a poor accuracy of channel estimation.

SUMMARY OF THE INVENTION

Two methods for configuring transmit power of sounding reference signal (SRS) are provided in embodiments of the present invention, which can guarantee the power of the cell having poor channel quality for receiving SRS, in order to ensure the accuracy of channel estimation.

A network device and a user equipment (UE) are also provided in embodiments of the present invention, which can guarantee the power of the cell having poor channel quality for receiving SRS, thereby ensuring the accuracy of channel estimation.

The technical schemes of the present invention are implemented as follows.

A method for configuring transmit power of sounding reference signal (SRS), including:

with a network device, determining SRS transmit power parameters according to power level of signal previously sent from a user equipment (UE) received by each cell to be detected and/or information of cells to be detected by the UE, and sending the SRS transmit power parameters to the UE.

A method for configuring transmit power of sounding reference signal (SRS), including:

with a user equipment (UE), receiving SRS transmit power parameters sent from a network device, calculating path loss from each cell to be detected to the UE, and calculating SRS transmit power by use of the path loss and the SRS transmit power parameters.

A network device, wherein the device is adapted to determine SRS transmit power parameters according to power level of signal previously sent from a user equipment (UE) received by each cell to be detected and/or information of cells to be detected by the UE, and send the SRS transmit power parameters to the UE.

A user equipment (UE), wherein the UE is adapted to receive SRS transmit power parameters sent from a network device, calculate path loss from each cell to be detected to the UE, and calculate SRS transmit power by use of the path loss and the SRS transmit power parameters.

The present invention puts forward a method for configuring SRS transmit power, a network device and a UE, which can have an overall consideration on path losses of multiple cells to be detected when calculating the SRS transmit power. Therefore, the power of the cell having poor channel quality for receiving SRS can be guaranteed, in order to ensure the accuracy of channel estimation.

BRIEF DESCRIPTION OF DRAWINGS

FIG. 1 is a schematic diagram illustrating the structure of an application system according to an embodiment of the present invention.

DETAILED DESCRIPTION OF THE INVENTION

A method and system for configuring SRS transmit power are put forward in the present invention. In the calculation of SRS transmit power, path losses of more than one cell to be detected are considered synthetically to ensure the power of a cell having poor channel quality for receiving the SRS, thereby guaranteeing the accuracy of channel estimation. There are several ways for considering the path losses of multiple cells to be detected.

One way is a network device adjusts SRS transmit power parameters (including $P_{SRS\_OFFSET}$, $M_{SRS}$, $P_{O\_PUSCH}(j)$, $\alpha(j)$ and $f(i)$) sent to a UE according to the path losses of the UE to the multiple cells to be detected (of course, due to characteristic of the parameters, the network device can only adjust part of the parameters), and the UE uses the adjusted SRS transmit power parameters to calculate the SRS transmit power.

Alternatively, the network device calculates power adjustment amount $P_d$ according to the SRS or other signals previously sent from the UE received by each of the cells to be detected, and sends $P_d$ and the SRS transmit power parameters to the UE; the UE calculates the SRS transmit power and uses $P_d$ to adjust the SRS transmit power after the calculation.

Or, the UE calculates the path loss of each cell to be detected and takes the path loss into consideration when calculating the SRS transmit power.

Or, the UE adjusts the calculated SRS transmit power based on a predefined amount of adjustment.

Or, combine the above mentioned ways to form a new way.

In the following, specific embodiments are given in details for presenting the method of the present invention for configuring SRS transmit power.

FIG. 1 is a schematic diagram illustrating the structure of an application system according to an embodiment of the present invention. In FIG. 1, the UE resides in cell 1, and performs detection for cells 1, 2 and 3.

Embodiment 1

Step 101: a network device determines parameters of the SRS transmit power, wherein the parameters of the SRS transmit power are determined according to power level of signal received by each cell to be detected and previously sent from the UE or number of cells need to be detected by the UE, and sends the parameters of the SRS transmit power to the UE.

In this step, the signal previously sent from the UE can be an SRS or other signals. The network device can adjust $P_{SRS\_OFFSET}$, $\alpha(j)$ or $f(i)$ included in the SRS transmit power parameters, where the SRS transmit power parameters include: $P_{SRS\_OFFSET}$, $M_{SRS}$, $P_{O\_PUSCH}(j)$, $\alpha(j)$, and $f(i)$. Here, $P_{O\_PUSCH}(j)$, $\alpha(j)$, and $f(i)$ are SRS transmit power parameters adjusted by the network device according to power level of signal previously sent from the UE received by each cell to be detected and/or information of cells to be detected by the UE. Specifically, the information of cells can be number of cells, cell location, cell radius, cell topology and other information.

Additionally, in this step, the network device may use a specific parameter configuration command for providing adjusted parameters of the SRS transmit power to the UE, and may also use an existing parameter configuration command for providing the parameters. Furthermore, the command may include an indication on whether the UE is required to perform a multi-cell channel detection, or include a cell set for which channel detection is required.

In this step, the network device may be the eNodeB of the resident cell of the UE, or an eNodeB of other cells to be detected, or a mobility management entity (MME) the eNodeBs belong to. In this embodiment, the cell set to be detected is a set including cells 1, 2 and 3.

Step 102: the UE calculates path loss PL to the resident cell (i.e., cell 1), adopts formula (1) to calculate the SRS transmit power by use of the adjusted SRS transmit power parameters and PL.

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)\} \quad (1)$$

Step 103: the UE feeds the SRS transmit power back to an eNodeB of cell 1, and the eNodeB of cell 1 sends the SRS transmit power to eNodeBs of all the cells to be detected (i.e., cells 2 and 3); or the eNodeB of cell 1 calculates the SRS transmit power according to other information fed back by the UE, such as Power Head Room, and sends the SRS transmit power to the eNodeBs of cells 2 and 3; or the UE directly feeds the SRS transmit power back to eNodeBs of all the cells to be detected.

Embodiment 2

Step 201 is the same as step 101.

Step 202: when the UE sends an SRS for detecting three cells, the UE may calculate the path loss to cell 1 HA, the path loss to cell 2 PL2 and the path loss to cell 3 PL3, and then calculate PL by using a specific function, such as taking the maximum value of the path losses as PL, i.e., PL=max(PL1, PL2, PL3) or taking the average of the three path losses as PL, i.e., PL=(PL1+PL2+PL3)/3 or using other functions for calculating PL.

When the UE sends an SRS to detect a cell, such as cell 2, the path loss PL2 from the UE to cell 2 is taken as PL, or an average value of PL2 and PL1 is taken as PL.

The UE uses the following formula (I) to calculate the SRS transmit power.

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)\} \quad (1)$$

Step 203 is the same as step 103.

Embodiment 3

Step 301: a network device determines SRS transmit power parameters according to power level of signal previously sent from a UE received by each cell to be detected or number of cells to be detected by the UE, and sends $P_d$ and the SRS transmit power parameters to the UE.

Here, the SRS transmit power parameters include: $P_{SRS\_OFFSET}$, $M_{SRS}$, $P_{O\_PUSCH}(j)$, $\alpha(j)$, $f(i)$ and $P_d$, where $P_d$ is an adjustment amount of power determined by the network device.

In this step, the signal previously sent from the UE is an SRS or other signal.

Additionally, in this step, the network device may use a specific parameter configuration command for providing parameters of the SRS transmit power to the UE, and may also use an existing parameter configuration command for providing the parameters. Furthermore, the network device may provide an indication to the UE on whether the UE is required to perform a multi-cell channel detection, or indicate a cell set for which channel detection is required for the UE.

Step 302: the UE calculates path loss PL of the resident cell (i.e., cell 1), and uses the received SRS transmit power parameters and the calculated PL to calculate the SRS transmit power by using the following formula:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_d\}$$

Step 303 is the same as step 103.

Embodiment 4

Step 401 is the same as step 301.

Step 402: when the UE sends an SRS for detecting three cells, the UE may calculate the path loss to cell 1 PL1, the path loss to cell 2 PL2 and the path loss to cell 3 PL3, and then calculate PL by using a specific function, such as taking the maximum value of the path losses as PL, i.e., PL=max(PL1, PL2, PL3), or taking the average of the three path losses as PL, i.e. PL=(PL1+PL2+PL3)/3 , or using other functions for calculating PL.

When the UE sends an SRS to detect a cell, such as cell 2, the path loss PL2 from the UE to cell 2 is taken as PL, or an average value of PL2 and PL1 is taken as PL.

The UE uses the received SRS transmit power parameters and the calculated PL to calculate the SRS transmit power by using the following formula:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_d\}$$

Step 403 is the same as step 103.

Embodiment 5

Step 501: a UE receives SRS transmit power parameters sent from a network device.

In this step, the UE can further be informed of whether to perform multi-cell channel detection, or a cell set need to be detected.

Step 502: the UE determines path loss PL specifically calculated as follows.

When the UE sends an SRS for detecting three cells, the UE may calculate the path loss to cell 1 PL1, the path loss to cell 2 PL2 and the path loss to cell 3 PL3, and then calculate PL by using a specific function, such as taking the maximum value of the path losses as PL, i.e., PL=max(PL1, PL2, PL3), or taking the average of the three path losses as PL, i.e., PL=(PL1+PL2+PL3)/3, or using other functions for calculating PL.

When the UE sends an SRS to detect one cell, such as cell 2, the path loss PL2 from the UE to cell 2 is taken as PL, or an average value of PL2 and PL1 is taken as PL.

The UE uses the received SRS transmit power parameters and the determined PL to calculate the SRS transmit power by using the following formula:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)\}$$

Step 503 is the same as step 103.

Embodiment 6

Step 601 is the same as step 501.

Step 602: the UE calculates path loss to the resident cell (cell 1), and uses the received SRS transmit power parameters and the calculated path loss from the UE to the resident cell to calculate the SRS transmit power by using the following formula:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_f\}$$

Here, $P_f$ is a predefined adjustment value determined according to the number of cells to be detected.

Step 603 is the same as step 103.

Embodiment 7

Step 701 is the same as step 601.

Step 702: the UE determines path loss PL, which can specifically be calculated as follows.

When the UE sends an SRS for detecting three cells, the UE may calculate the path loss to cell 1 PL1, the path loss to cell 2 PL2 and the path loss to cell 3 PL3 and then calculate PL by using a specific function, such as taking the maximum value of the path losses as PL, i.e., PL=max(PL1, PL2, PL3), or taking the average of the three path losses as PL, i.e., PL=(PL1+PL2+PL3)/3 or using other functions for calculating PL.

When the UE sends an SRS to detect a cell, such as cell 2, the path loss PL2 from the UE to cell 2 is taken as PL, or an average value of PL2 and PL1 is taken as PL.

The UE uses the received SRS transmit power parameters and the determined PL to calculate the SRS transmit power by using the following formula:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_f\}$$

Here, $P_f$ is a predefined adjustment value determined according to the number of cells to be detected.

Step 703 is the same as step 103.

Embodiment 8

Step 801 is the same as step 301.

Step 802: the UE calculates the path loss PL to the resident cell (i.e., cell 1), and uses the received SRS transmit power parameters and the calculated PL to calculate the SRS transmit power by using the following formula:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_d+P_f\}$$

Here, $P_f$ is a predefined adjustment value, wherein the adjustment value can be determined according to the number of cells to be detected.

Step 803 is the same as step 103.

Embodiment 9

Step 901 is the same as step 801.

Step 902: the UE determines path loss PL, which can specifically be calculated as follows.

When the UE sends an SRS for detecting three cells, the UE may calculate path loss to cell 1 PL1, path loss to cell 2 PL2 and path loss to cell 3 PL3, and then calculate PL by using a specific function, such as taking the maximum value of the path losses as PL, i.e., PL=max(PL1, PL2, PL3) or taking the average of the three path losses as PL, i.e., PL=(PL1+PL2+PL3)/3 or using other functions for calculating PL.

When the UE sends an SRS to detect a cell, such as cell 2, the path loss PL2 from the UE to cell 2 can be taken as PL, or an average value of PL2 and PL1 can be taken as PL.

The UE uses the received SRS transmit power parameters and the determined PL to calculate SRS transmit power by using the following formula:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_d+P_f\}$$

Here, $P_f$ is a predefined adjustment value determined according to the number of cells to be detected.

Step 903 is the same as step 103.

The present invention also proposes a network device for determining SRS transmit power parameters according to power level of signal previously sent from a UE received by each cell to be detected and/or information of cells to be detected by the UE, and sending the SRS transmit power parameters to the UE.

Embodiments of the present invention also propose a UE, adapted to receive SRS transmit power parameters sent from a network device, calculate path loss from each cell to be detected to the UE, and calculate SRS transmit power by use of the path loss and the SRS transmit power parameters.

It can be seen from the above embodiments that, the method and system in the present invention take an overall consideration on path losses of multiple cells to be detected when configuring SRS transmit power. That is, the present invention tries to limit power level of signals received by a cell having relatively small path loss on the premise of ensuring quality of signals received by a cell having the largest path loss; or to improve quality of signals received by the cell having the largest path loss on the premise of controlling power level of signals received by the cell having relatively small path loss not to exceed a certain value; or to achieve equilibrium between the two cells. In this way, the power of the cell having poor channel quality for receiving SRS can be guaranteed by use of the present invention to configure SRS transmit power, in order to ensure the accuracy of channel estimation.

The above is only embodiments of the present invention, and not used to limit the present invention. Any changes, equivalent replacement, improvements etc. made within the spirit and principles of the present invention should be included within the protection scope of the present invention.

The invention claimed is:

1. A method for configuring transmit power of sounding reference signal (SRS), comprising:
   with a network device, determining SRS transmit power parameters according to power level of signal previously sent from a user equipment (UE) received by multiple cells to be detected, or according to the power level and information of the multiple cells to be detected by the UE, and sending the SRS transmit power parameters to the UE, wherein the information of the multiple cells comprises: number of cells, cell location, cell radius, or cell topology;
   with the user equipment, receiving the SRS transmit power parameters sent from the network device, calculating path loss from the multiple cells to be detected to the UE, and calculating SRS transmit power by use of the path loss and the SRS transmit power parameters.

2. The method according to claim 1, wherein the signal previously sent from a UE is a sounding reference signal.

3. The method according to claim 1, wherein the SRS transmit power parameters comprise: $P_{SRS\_OFFSET}$, $M_{SRS}$, $P_{O\_PUSCH}(j)$, $\alpha(j)$ and $f(i)$, wherein $P_{O\_PUSCH}(j)$, $\alpha(j)$ and $f(i)$ are SRS, transmit power parameters adjusted by the network device according to the power level of the signal previously sent from the UE received by the multiple cells to be detected and the information of the multiple cells to be detected by the UE; and
   wherein calculating the SRS transmit power comprises: calculating the SRS transmit power according to formula $$P_{SRS}(i)=\min\{P_{CMAX},P_{SRS\_OFFSET}+10\log_{10}(M_{SRS})+P_{O\_PUSCH}(j)+\alpha(j)\cdot PL+f(i)\},$$

wherein $P_{SRS}(i)$ is the SRS transmit power, i is a sub-frame number of the SRS, $P_{CMAX}$ is maximum transmit power of the UE, and PL is the path loss.

4. The method according to claim 1, wherein the SRS transmit power parameters comprise: $P_{SRS\_OFFSET}$, $M_{SRS}$, $P_{O\_PUSCH}(j)$, $\alpha(j)$ and $f(i)$ and $P_d$, wherein $P_d$ is an adjustment amount of power determined by the network device; and
   wherein calculating the SRS transmit power comprises: calculating the SRS transmit power according to formula $$P_{SRS}(i)=\min\{P_{CMAX},P_{SRS\_OFFSET}+10\log_{10}(M_{SRS})+P_{O\_PUSCH}(j)+\alpha(j)\cdot PL+f(i)+P_d\}$$

wherein $P_{SRS}(i)$ is the SRS transmit power, i is a sub-frame number of the SRS, $P_{CMAX}$ is maximum transmit power of the UE, and PL is the path loss.

5. The method according to claim 1, wherein the SRS transmit power parameters comprise: $P_{SRS\_OFFSET}$, $M_{SRS}$, $P_{O\_PUSCH}(j)$, $\alpha(j)$ and $f(i)$; and
   wherein calculating the SRS transmit power comprises: calculating the SRS transmit power according to formula $$P_{SRS}(i)=\min\{P_{CMAX},P_{SRS\_OFFSET}+10\log_{10}(M_{SRS})+P_{O\_PUSCH}(j)+\alpha(j)\cdot PL+f(i)+P_f\}$$

wherein $P_{SRS}(i)$ is the SRS transmit power, i is a sub-frame number of the SRS, $P_{CMAX}$ is maximum transmit power of the UE, PL is the path loss, and $P_f$ is a predefined adjustment value.

6. The method according to claim 1, further comprising: the network device instructing the UE whether to perform multi-cell channel detection, or indicating a cell set for which channel detection is needed for the UE.

7. The method according to claim 1, further comprising:
   with an evolved Node B (eNodeB) of a resident cell of the UE, receiving SRS transmit power information sent from the UE, and sending the SRS transmit power information to all eNodeBs of the cells to be detected; or
   with the eNodeB of the resident cell, calculating SRS transmit power information according to information fed back by the UE, and providing the SRS transmit power information to all eNodeBs of the cells to be detected; or
   with each of the eNodeBs of all the cells to be detected, receiving SRS transmit power information sent from the UE.

8. The method according to claim 1, wherein the network device comprises an eNodeB of a resident cell of the UE, or an eNodeB of a cell to be detected other than the resident cell, or a mobility management entity (MME) of the eNodeBs.

9. A method for configuring transmit power of sounding reference signal (SRS), comprising:
   with a user equipment (UE), receiving SRS transmit power parameters sent from a network device, calculating path loss from multiple cells to be detected to the UE, and calculating SRS transmit power by use of the path loss and the SRS transmit power parameters.

10. The method according to claim 9, wherein the SRS transmit power is calculated by the UE according to formula $$P_{SRS}(i)=\min\{P_{CMAX},P_{SRS\_OFFSET}+10\log_{10}(M_{SRS})+P_{O\_PUSCH}(j)+\alpha(j)\cdot PL+f(i)+P_f\};$$

wherein $P_{SRS}(i)$ is the SRS transmit power, i is a sub-frame number of the SRS, $P_{CMAX}$ is maximum transmit power of the UE, $P_{SRS\_OFFSET}$, $M_{SRS}$, $P_{O\_PUSCH}(j)$, $\alpha(j)$ and $f(i)$ are the SRS transmit power parameters, PL is path loss from the UE to its resident cell, and $P_f$ is a predefined adjustment value.

11. The method according to claim 9, wherein the SRS transmit power is calculated by the UE by use of the determined path loss when the UE sends an SRS to detect multiple cells, wherein the determined path loss is an average value or the maximum value of the path loss from the UE to the multiple cells to be detected.

12. The method according to claim 9, wherein the SRS transmit power is calculated by use of the determined path loss when the UE sends an SRS to detect one cell, wherein the determined path loss is the path loss from the cell to be detected to the UE or an average value of the path loss from a resident cell to the UE and the path loss from the cell to be detected to the UE.

13. The method according to claim 11, wherein the SRS transmit power parameters comprise: $P_{SRS\_OFFSET}$, $M_{SRS}$, $P_{O\_PUSCH}(j)$, $\alpha(j)$ and $f(i)$; and
    the SRS transmit power is calculated by the UE according to formula $$P_{SRS}(i)=\min\{P_{CMAX},P_{SRS\_OFFSET}+10\log_{10}(M_{SRS})+P_{O\_PUSCH}(j)+\alpha(j)\cdot PL+f(i)\};$$

wherein $P_{SRS}(i)$ is the SRS transmit power, i is a sub-frame number of the SRS, $P_{CMAX}$ is maximum transmit power of the UE, and PL is the path loss determined.

14. The method according to claim 11, wherein the SRS transmit power parameters comprise: $P_{SRS\_OFFSET}$, $M_{SRS}$, $P_{O\_PUSCH}(j)$, $\alpha(j)$ and $f(i)$, and $P_d$, wherein $P_d$ is an adjustment amount of power determined by the network device; and
the SRS transmit power is calculated by the UE according to formula $$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_d\};$$

wherein $P_{SRS}(i)$ is the SRS transmit power, i is a sub-frame number of the SRS, $P_{CMAX}$ is maximum transmit power of the UE, and PL is the path loss determined.

15. The method according to claim 11, wherein the SRS transmit power parameters comprise: $P_{SRS\_OFFSET}$, $M_{SRS}$, $P_{O\_PUSCH}(j)$, $\alpha(j)$ and $f(i)$; and
the SRS transmit power is calculated by the UE according to formula $$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)+P_d+P_f\};$$

wherein $P_{SRS}(i)$ is the SRS transmit power, i is a sub-frame number of the SRS, $P_{CMAX}$ is maximum transmit power of the UE, PL is the path loss determined, and $P_f$ is a predefined adjustment value.

16. The method according to claim 9, further comprising: the network device instructing the UE whether to perform multi-cell channel detection, or indicating a cell set for which channel detection is needed for the UE.

17. The method according to claim 9, further comprising: after the SRS transmit power is calculated by the UE, the UE providing the SRS transmit power information to an eNodeB of its resident cell, or the UE providing the SRS transmit power information to all eNodeBs of the cells to be detected.

18. A system, comprising:
a network device, to determine SRS transmit power parameters according to power level of signal previously sent from a user equipment (UE) received by multiple cells to be detected, or according to the power level and information of the multiple cells to be detected by the UE, and send the SRS transmit power parameters to the UE, wherein the information of the multiple cells comprises: number of cells, cell location, cell radius, or cell topology;
the user equipment, to receive the SRS transmit power parameters sent from the network device, calculate path loss from the multiple cells to be detected to the UE, and calculate SRS transmit power by use of the path loss and SRS transmit power parameters.

19. A user equipment (UE), wherein the UE is adapted to receive SRS transmit power parameters sent from a network device, calculate path loss from multiple cells to be detected to the UE, and calculate SRS transmit power by use of the path loss and the SRS transmit power parameters.

* * * * *